United States Patent [19]
Hashimoto et al.

[11] Patent Number: 5,989,704
[45] Date of Patent: Nov. 23, 1999

[54] INTEGRALLY MOLDED AUTOMOTIVE WATERPROOF CONNECTOR COMPRISING THERMOPLASTIC RESIN AND OIL-BLEEDING SILICONE RUBBER

[75] Inventors: Hiroshi Hashimoto; Masahiro Kanda, both of Shizuoka; Shigeru Muramatsu; Naoto Obayashi, both of Kanagawa; Hironao Fujiki, Gunma; Shigeki Shudo, Gunma; Manabu Narumi, Gunma, all of Japan

[73] Assignees: Yazaki Corporation; Mitsubishi Engineering Plastics Co., Ltd., both of Tokyo, Japan

[21] Appl. No.: 08/766,963

[22] Filed: Dec. 16, 1996

[30] Foreign Application Priority Data

Dec. 15, 1995 [JP] Japan ..................... 7-347895

[51] Int. Cl.$^6$ .............. B32B 5/16; B32B 25/20; B32B 27/36
[52] U.S. Cl. ............ 428/331; 428/412; 428/451
[58] Field of Search .................. 428/412, 447, 428/451, 331

[56] References Cited

U.S. PATENT DOCUMENTS 5,366,806  11/1994  Fujiki et al. ..................... 428/412
5,418,065  5/1995  Fujiki et al. ..................... 428/451

FOREIGN PATENT DOCUMENTS 62-252457  11/1987  Japan .
63-183843   7/1988  Japan .
63-45292    9/1988  Japan .
 234311     8/1990  Japan .
61-71021    6/1994  Japan .
61-71023    6/1994  Japan .

*Primary Examiner*—D. S. Nakarani
*Attorney, Agent, or Firm*—Sughrue, Mion, Zinn, Macpeak & Seas, PLLC

[57] ABSTRACT

An integrally molded automotive waterproof connector is disclosed which comprises a thermoplastic resin and integrated therewith an oil-bleeding silicone rubber, the thermoplastic resin containing a thermoplastic resin oligomer containing at least one aliphatic unsaturated group. In the connector, the adhesion between the thermoplastic resin and the silicone rubber is satisfactory regardless of the length of storage period as compared with connectors comprising a thermoplastic resin and a silicone rubber integrated therewith after priming. Further, the connector of the present invention is excellent in production efficiency and workability, is reduced in connector housing fitting force, and can retain satisfactory waterproofness.

9 Claims, 2 Drawing Sheets

INTEGRALLY MOLDED AUTOMOTIVE WATERPROOF CONNECTOR COMPRISING THERMOPLASTIC RESIN AND OIL-BLEEDING SILICONE RUBBER

FIELD OF THE INVENTION

The present invention relates to an integrally molded automotive waterproof connector comprising a thermoplastic resin and an oil-bleeding silicone rubber. This connector not only is excellent in production efficiency and workability because it can be easily molded with an injection molding machine in a short period, but also is reduced in connector housing fitting force and can retain satisfactory waterproofness.

BACKGROUND OF THE INVENTION

Connectors used for connections in electrical circuits in motor vehicles are required to have a high-degree of waterproof sealing performance as well as oil resistance. Oil-bleeding rubber materials are therefore used frequently as sealing rubber parts for these connectors, such as, e.g., packings and rubber plugs. Recently used as a molding material is an oil-bleeding silicone rubber comprising a silicone rubber having excellent heat, cold, and oil resistance and a silicone oil incorporated therein (see JP-A-62-252457; the term "JP-A" as used herein means an "unexamined published Japanese patent application").

Many techniques for bonding an addition-curing silicone rubber to an organic resin have hitherto been proposed. Examples thereof include a method in which a primer is applied to the surface of a molded resin and an uncured silicone rubber is applied to the primed surface and cured, and a method in which a self-bonding silicone rubber material is cured on a molded resin. With respect to this self-bonding silicone rubber composition, many proposals have been made especially on techniques concerning bonding ingredients therefor. Further, other techniques proposed so far include a method in which an organopolysiloxane containing directly silicon-bonded hydrogen atoms in an amount of at least 30 mol % is added to an organic resin and this organic resin is bonded to an addition-curing silicone rubber (JP-B-2-34311; the term "JP-B" as used herein means an "examined Japanese patent publication"); a method in which a silicone rubber is integrated with an organic resin by means of physical fitting (JP-B-63-45292); a method in which a silicone rubber is bonded to and integrated with an olefin resin onto which a compound having an aliphatic unsaturated group and a silicon-bonded hydrolyzable group has been grafted (JP-A-63-183843); and a method in which a thermoplastic resin containing a compound having an unsaturated group and a directly silicon-bonded hydrogen atom is bonded to and integrated with a silicone rubber, as proposed by the present inventors in the specification of a previous patent application.

However, the prior art techniques described above have drawbacks as follows. The method of using a primer for bonding necessitates the troublesome procedure of taking a molded resin out of the mold and priming the resin molding. The method of applying a self-bonding silicone rubber to a molded resin and curing the rubber has a serious drawback that when a mold or the like is used for the molding of the resin and the silicone rubber, the silicone rubber itself adheres to the mold. In addition, although use of the self-bonding silicone rubber poses no problem when it is cured after being applied to a resin molding, the addition-curing self-bonding silicone shows insufficient adhesion to some of many general-purpose resins, e.g., ABS, PPO, PPS, polycarbonates, acrylics, PE, PP, and Teflon, when it is used for producing integrally molded articles. Further, the method of adding a hydrogenpolysiloxane to an olefin resin, among the proposed techniques described above, has a drawback that the addition of the siloxane may modify properties of the resin itself, making it difficult to obtain the properties inherent in the resin. The method of using physical fitting for obtaining an integral article is disadvantageous in that the fitted parts may be separated from each other by a physical force. The method of using an olefin resin onto which a compound having an aliphatic unsaturated group and a silicon-bonded hydrolyzable group has been grafted has a drawback that use of a primer is necessary when an addition-curing silicone rubber is integrated with the olefin resin.

On the other hand, for eliminating these problems, there has been a desire for an integral waterproof connector made of a thermoplastic resin and, tenaciously bonded thereto, an oil-bleeding silicone rubber from which an oil bleeds out after molding.

In this respect, a technique for obtaining a tenaciously bonded integral molding from a thermoplastic resin having aliphatic unsaturated groups and a silicone rubber containing a specific bonding ingredient was proposed by the present inventors in JP-A-6-171021 and JP-A-6-171023. However, no proposals were made therein on adhesion to an oil-bleeding silicone rubber, because this bonding was technically difficult in those days.

SUMMARY OF THE INVENTION

An object of the present invention is to provide an integrally molded automotive waterproof connector which is made of a thermoplastic resin containing aliphatic unsaturated groups and an oil-bleeding silicone rubber tenaciously bonded to the resin, and which is excellent in production efficiency and workability and capable of retaining satisfactory waterproofness to thereby eliminate the problems of prior art automotive waterproof connectors comprising a thermoplastic resin and an oil-bleeding silicone rubber.

As a result of intensive investigations made by the present inventors in order to accomplish the above object, they have found that when a thermoplastic resin, in particular a thermoplastic resin composition comprising a thermoplastic resin and incorporated therein a thermoplastic resin oligomer containing at least one aliphatic unsaturated group, is used and an oil-bleeding silicone rubber is integrated therewith, the two materials are tenaciously bonded to each other to give an integrally molded automotive waterproof connector which is made of the thermoplastic resin and the oil-bleeding silicone rubber and in which the bonding strength is sufficient for practical use. It has also been found that by selecting an adhesive (adhesion promoter) to be incorporated into the silicone rubber, the silicone rubber can be made to satisfactorily adhere to the thermoplastic resin in a short curing time in injection molding while maintaining the practically sufficient mold releasability of the silicone rubber itself, whereby an integrally molded, thermoplastic resin/silicone rubber automotive waterproof connector can be obtained efficiently. The present invention has been achieved based on these findings.

Accordingly, the present invention provides an integrally molded automotive waterproof connector comprising a thermoplastic resin, specifically a thermoplastic resin containing a thermoplastic resin oligomer containing at least one aliphatic unsaturated group, and an oil-bleeding silicone rubber.

DESCRIPTION OF THE SYMBOLS 1 male housing
2 female housing
3 rubber packing
4 rubber plug
5 water tank
6 air tube
7 male metal terminal
8 female metal terminal
9 wire

DETAILED DESCRIPTION OF THE INVENTION

Examples of the thermoplastic resin used in the present invention include regular olefin polymers and condensation polymers. Specific examples thereof include ABS (acrylonitrile/butadiene/styrene copolymer) resins, styrene resins, polyethylene resins, polypropylene resins, acrylic resins, polycarbonate resins, poly(ethylene terephthalate) resins, poly(butylene terephthalate) resins, poly(phenylene oxide) resins, poly(phenylene sulfide) resins, polysulfone resins, nylon resins, and liquid-crystal resins. Mixtures of these resins are also usable. More specific examples of usable thermoplastic resins include: polycarbonate resins having tert-butylphenol residues as terminal groups and produced through the same polymerization as for the thermoplastic resin oligomer containing at least one unsaturated group which will be described later; poly(ethylene terephthalate) and poly(butylene terephthalate) resins synthesized by polycondensation; polypropylene resins synthesized by coordination polymerization using a Ziegler-Natta catalyst; and commercial resins such as ABS resins, styrene resins, polyethylene resins, acrylic resins, nylon resins, poly(phenylene oxide) resins, poly(phenylene sulfide) resins, polysulfone resins, and liquid-crystal resins.

On the other hand, the thermoplastic resin oligomer containing at least one aliphatic unsaturated group, which is incorporated into the thermoplastic resin described above, is not particularly limited as long as it is a compound which has structural units of the kind contained in any of the thermoplastic resins enumerated above and contains one or more aliphatic unsaturated groups as side chains or at terminals. However, a thermoplastic resin oligomer having directly silicon-bonded hydrogen atoms and a reactive group capable of undergoing a hydrosilylation reaction in the presence of a platinum catalyst is useful, the reactive group being preferably an alkenyl group having 2 to 10, especially 2 to 4, carbon atoms, e.g., vinyl, allyl, or isopropenyl. From this standpoint, it is preferred that the thermoplastic resin oligomer be not a compound having a carbon-carbon chain (backbone) containing one or more aliphatic unsaturated bonds therein.

This oligomer desirably has a high molecular weight from the standpoint of maintaining the properties of the thermoplastic resin after cure. In this case, however, if the oligomer contains a large amount of aliphatic unsaturated groups per molecule, the addition amount thereof may be limited because this oligomer causes the silicone rubber to suffer curing failure on the surface of the cured thermoplastic resin. If the thermoplastic resin oligomer having at least one aliphatic unsaturated group has too low a molecular weight, there are cases where the thermoplastic resin has impaired properties after cure. Therefore, from the standpoints of ensuring the intact properties of the thermoplastic resin and avoiding curing failure, the number-average molecular weight of the thermoplastic resin oligomer is desirably about from 250 to 5,000, preferably about from 1,000 to 3,000. The content of the aliphatic unsaturated groups, including terminal groups, is desirably about from 0.1 to 70% by mole, preferably about from 5 to 50% by mole, based on all repeating units constituting the oligomer.

More specifically, the thermoplastic resin oligomer for use in the present invention contains at least one aliphatic unsaturated double or triple bond on the average per molecule including the backbone and terminals. However, double bonds are preferred because triple bonds tend to adversely influence the weatherability and heat resistance of the resin. Although the unsaturated double bonds contained in the resin may be any olefin alkenyl groups, they are desirably vinyl, allyl, isopropyl, or the like and are preferably not internal olefins.

The oligomer intramolecularly modified with aliphatic unsaturated groups, for use in the present invention, is not particularly limited as long as it is a thermoplastic resin oligomer satisfying the requirements described above. However, the oligomer is preferably a thermoplastic polycarbonate oligomer or a thermoplastic polyester oligomer from the standpoints of compatibility with the resin and retention of properties.

In the case of using a thermoplastic polycarbonate oligomer, it can be produced by the same interfacial polymerization process or the same solution process, e.g., the pyridine method or chloroformate method, as for conventional aromatic thermoplastic resins, except that a dihydric phenol having an aliphatic unsaturated bond is used as a starting material, that a monofunctional compound having an aliphatic unsaturated bond is used as a regulator or chain terminator, or that the dihydric phenol and the monofunctional compound are used in combination.

In the case of using a thermoplastic polyester oligomer, it can be produced by the dehydrating condensation of a polycarboxylic acid with a polyhydric alcohol or the transesterification of a polycarboxylic acid ester with a polyhydric alcohol, or by condensing a polycarboxylic acid halide with a polyhydric alcohol with elimination of hydrochloric acid in the presence of a base.

Preferred dihydric phenol compounds usable for producing the thermoplastic polycarbonate oligomer for use in the present invention are represented by general formula (A):

(A)

(wherein $R^3$ to $R^{10}$ each represents a hydrogen atom, a halogen atom, or an optionally substituted alkyl, alkoxy, aryl, or alkenyl group having 1 to 12, preferably 1 to 8, carbon atoms, and X represents any of the following:

wherein $R^{11}$ and $R^{12}$ each represents a hydrogen atom, a halogen atom, or an optionally substituted alkyl, aryl, alkenyl, or alkyne group having 1 to 8, preferably 1 to 6, carbon atoms, or $R^{11}$ and $R^{12}$ are bonded to each other to form a carbon ring or heterocycle, and symbol a is a positive number of 1 or larger).

Examples of these dihydric phenol compounds include 2,2-bis(4-hydroxy-3-allylphenyl)propane, 2,4-bis(4-hydroxyphenyl)-4-methyl-1-pentene, 2,4-bis(4-hydroxyphenyl)-4-methyl-2-pentene, bis(4-hydroxyphenyl) methane, bis(4-hydroxyphenyl) ether, bis(4-hydroxyphenyl) sulfone, bis(4-hydroxyphenyl) sulfoxide, bis(4-hydroxyphenyl) sulfide, bis(4-hydroxyphenyl) ketone, 1,1-bis(4-hydroxyphenyl)ethane, 2,2-bis(4-hydroxyphenyl) propane (bisphenol A; BPA), 2,2-bis(4-hydroxyphenyl) butane, 1,1-bis(4-hydroxyphenyl)-cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl) propane, 2,2-bis(4-hydroxy-3,5-dimethylphenyl)-propane, 1,1-bis(4-hydroxyphenyl)-1-phenylethane, bis(4-hydroxyphenyl)diphenylmethane, 2,2-bis(4-hydroxy-3-methylphenyl)propane, and 1,7-bis(4-hydroxy-3-methoxyphenyl)-1,6-heptadiene-3,5-dione (curcumin). A combination of two or more of these dihydric phenol compounds can also be used.

Examples of the monofunctional compound having an aliphatic unsaturated double bond, which is used for incorporating terminal unsaturated groups, include unsaturated carboxylic acids such as acrylic acid, methacrylic acid, vinylacetic acid, 2-pentenoic acid, 3-pentenoic acid, 5-hexenoic acid, 9-decenoic acid, and 9-undecenoic acid; acid chlorides and chloroformates, such as acryloyl chloride, methacryloyl chloride, sorboyl chloride, allyl chloroformate, and isopropenylphenyl chloroformate; phenols having an aliphatic unsaturated group, such as isopropenylphenol, hydroxystyrene, o-allylphenol, eugenol, hydroxyphenylmaleimide, and allyl hydroxybenzoate; and vinylsilanes such as chloroformyldimethoxyvinylsilane and 3-carboxypropyldiethoxyvinylsilane. These compounds can be used in combination of two or more thereof. The monofunctional compound having an aliphatic unsaturated double bond may be replaced with a conventional chain terminator, e.g., phenol or p-tert-butylphenol, or used in combination therewith, as long as the resulting polycarbonate oligomer contains at least one aliphatic unsaturated double bond per molecule on the average. These chain terminators are used in an amount of usually from 0.1 to 70% by mole, preferably from 5 to 50% by mole, based on the amount of the dihydric phenol compound.

A branching agent can be further used in an amount of from 0.01 to 3% by mole, preferably from 0.1 to 1% by mole, based on the amount of the dihydric phenol compound to obtain a branched polycarbonate. Examples of the branching agent include polyhydroxy compounds such as phloroglucin, 2,6-dimethyl-2,4,6-tri(4-hydroxyphenyl) heptene-3, 4,6-dimethyl-2,4,6-tri(4-hydroxyphenyl) heptene-2, 1,3,5-tri(2-5 hydroxyphenyl)benzole, 1,1,1-tri(4-hydroxyphenyl)ethane, 2,6-bis(2-hydroxy-5-methylbenzyl)-4-methylphenol, and α,α',α"-tri(4-hydroxyphenyl)-1,3,5-triisopropylbenzene, and further include 3,3-bis(4-hydroxyphenyl)oxindole (=isatin bisphenol).

On the other hand, examples of the thermoplastic polyester oligomer include allyl ester compounds synthesized by the transesterification or condensation reaction of unsaturated monohydric alcohols or allyl halides with polycarboxylic acids or derivatives thereof and unsaturated ester compounds synthesized by the polycondensation reaction of polycarboxylic acids or derivatives thereof with polyhydric alcohols. Examples of the unsaturated monohydric alcohols used for synthesizing the allyl ester compounds include allyl alcohol and methallyl alcohol, and examples of the allyl halides include allyl chloride. Examples of the polycarboxylic acids or derivatives thereof used for synthesizing the allyl ester compounds include phthalic acid, phthalic anhydride, and isophthalic acid.

Examples of polycarboxylic acids usable for producing the thermoplastic polyester oligomer include saturated polycarboxylic acids such as phthalic acid, isophthalic acid, adipic acid, sebacic acid, terephthalic acid, tetrahydrophthalic acid, tetrachlorophthalic acid, oxalic acid, malonic acid, succinic acid, and cyclopentanedi-carboxylic acid and unsaturated polycarboxylic acids such as allyloxyisophthalic acid, allyloxyterephthalic acid, allylmalonic acid, maleic acid, maleic anhydride, fumaric acid, citraconic acid, mesaconic acid, itaconic acid, and tetrahydrophthalic acid.

Examples of polyhydric alcohols usable for producing the thermoplastic polyester oligomer include glycols such as ethylene glycol, propylene glycol, butanediol, hexamethylene glycol, hydrogenated bisphenol A, neopentyl glycol, diethylene glycol, triethylene glycol, and dipropylene glycol and alkenyl-containing polyhydric alcohols such as glycerol monoallyl ether, trimethylolpropane monoallyl ether, pentaerythritol monoallyl ether, and pentaerythritol diallyl ether.

Various thermoplastic polyester oligomers are synthesized from various combinations of starting materials selected from saturated polycarboxylic acids, unsaturated polycarboxylic acids, glycols, and alkenyl-containing polyhydric alcohols. However, saturated polycarboxylic acids, unsaturated polycarboxylic acids, and glycols are desirably used as starting materials for the oligomer used in the present invention, from the standpoint of properties of the cured resin.

In the present invention, the thermoplastic resin oligomer containing at least one aliphatic unsaturated group is incorporated preferably in an amount of from 0.1 to 15 parts by weight per 100 parts by weight of the thermoplastic resin. If the amount thereof exceeds 15 parts by weight, this causes an addition-curing silicone rubber composition to suffer curing failure. A preferred method for mixing the thermoplastic resin with the thermoplastic resin oligomer containing at least one aliphatic unsaturated group is to mix the two ingredients with heating and pelletize the mixture by a known means such as, e.g., a kneader or continuous extrusion kneading.

Reinforcing fillers, e.g., glass fibers and carbon fibers, various stabilizers, e.g., hindered phenols, release agents, e.g., waxes, and other additives can be incorporated into the thermoplastic resin according to purposes.

The oil-bleeding silicone rubber to be integrated with the thermoplastic resin is then explained. A heat-curing silicone rubber composition is suitable for the production of the silicone rubber. Examples of such materials include silicone rubber compositions which are cured with an organic peroxide and silicone rubber compositions which cure through an addition reaction. Of these, the addition-curing silicone rubber compositions are desirable because they can be molded in a short time.

A preferred oil-bleeding addition-curing silicone rubber composition comprises:

(a) an alkenyl-containing organopolysiloxane, 100 parts by weight

(b) an organohydrogenpolysiloxane having at least two directly silicon-bonded hydrogen atoms per molecule, in such an amount that the total amount of the directly silicon-bonded hydrogen atoms contained in ingredients (b) and (d) is from 0.4 to 5 equivalents to the alkenyl groups contained in ingredient (a), (c) a catalytic amount of platinum or a platinum group metal compound, (d) an adhesion promoter, 0.1 to 50 parts by weight (e) a phenyl silicone oil represented by the following general formula (1), 0.1 to 30 parts by weight (f) a finely powdered silica having a specific surface area of 50 m²/g or larger, 0 to 50 parts by weight (1)

(In the formula, $R^1$ represents an unsubstituted or substituted monovalent hydrocarbon group, a hydrolyzable group, or a hydroxyl group and $R^2$ represents an unsubstituted or substituted monovalent hydrocarbon group, provided that from 5 to 80% by mole of all the groups of $R^1$ and $R^2$ are phenyl; and n is a positive number of 2 or larger).

Each component of the above silicone rubber composition is explained below. The alkenyl-containing organopolysiloxane of ingredient (a) is a known organopolysiloxane used as the main component of a regular addition-curing silicone rubber. A usable example thereof has a viscosity at ordinary temperature (e.g., 25° C.) of from 100 to 300,000 cP, especially from 1,000 to 100,000 cP and is represented by the general formula $R_aSiO_{(4-a)/2}$.

In the above formula, R represents a substituted or unsubstituted monovalent hydrocarbon group having 1 to 10, especially 1 to 8, carbon atoms. Examples of the hydrocarbon group include alkyl groups such as methyl, ethyl, and propyl, alkenyl groups such as vinyl, allyl, propenyl, and butenyl, aryl groups such as phenyl and xylyl, and halogen- or cyano-substituted hydrocarbon groups such as 3,3,3-trifluoropropyl and cyanoethyl. Although the substituents may be the same or different, the organopolysiloxane should contain aliphatic unsaturated hydrocarbon groups, e.g., alkenyl groups, in the molecule. Symbol a is from 1.9 to 2.4, preferably from 1.95 to 2.05. This organopolysiloxane may be linear, or have a branched structure containing $RSiO_{3/2}$ units or $SiO_{4/2}$ units. However, the organopolysiloxane is generally a linear diorganopolysiloxane consisting of a backbone basically made up of repeating diorganosiloxane units ($R_2SiO_{2/2}$) and terminated at each end by a triorganosilyl group ($R_3SiO_{1/2}$). Although the substituents bonded to the silicon atoms may basically be any of the groups enumerated above, the aliphatic unsaturated groups are preferably vinyl and the other substituents are desirably methyl or phenyl. At least two, desirably from 0.01 to 10% by mole, and particularly preferably from 0.1 to 2% by mole, of the silicon-bonded substituents R in the molecule are alkenyl groups. These alkenyl groups may be bonded to the silicon atoms located at the molecular ends or to silicon atoms located somewhere within the molecular chain, or may be bonded to both. However, the organopolysiloxane preferably contains alkenyl groups respectively bonded to the silicon atoms located at both molecular ends, from the standpoint of curability or the mechanical strength and other properties of the cured silicone rubber. Such an organopolysiloxane can be produced by a known method comprising subjecting an organocyclopolysiloxane and a hexaorganodisiloxane to an equilibrating reaction in the presence of an alkali or acid catalyst.

The organohydrogenpolysiloxane of ingredient (b) used in the present invention reacts with ingredient (a) to function as a crosslinking agent. There are no particular limitations on the molecular structure of this organohydrogenpolysiloxane, and it can be any of various conventionally produced organohydrogenpolysiloxanes having, for example, a linear, cyclic, branched, or three-dimensional network structure. However, the organohydrogenpolysiloxane should contain at least two, preferably three or more, directly silicon-bonded hydrogen atoms per molecule.

Specially, a preferred organohydrogenpolysiloxane has at least two, preferably three or more, silicon-bonded hydrogen atoms, is liquid at ordinary temperature, and is represented by the empirical formula (wherein R' is a substituted or unsubstituted monovalent hydrocarbon group having 1 to 10 carbon atoms, preferably having 1 to 8 carbon atoms excluding those contained in an aliphatic unsaturated bond, examples of the hydrocarbon group including the same monovalent hydrocarbon groups enumerated hereinabove; and b is a positive number of 0.7 to 2.1, preferably 1 to 2, and c is a positive number of 0.002 to 1, preferably 0.01 to 0.5, provided that b+c is 0.8 to 3, preferably 1.5 to 2.6).

Examples of the above organohydrogenpolysiloxane include methylhydrogenpolysiloxane terminated at each end by a trimethylsiloxy group-, a dimethylsiloxane/methylhydrogen-polysiloxane copolymer terminated at each end by a trimethylsiloxy group, dimethylsiloxane terminated at each end by a dimethylhydrogensiloxy group, dimethylsiloxane terminated at each end by a dimethylhydrogenpolysiloxy group, a dimethylsiloxane/methylhydrogenpolysiloxane copolymer terminated at each end by a dimethylhydrogenpolysiloxy group, a methylhydrogenpolysiloxane/diphenylsiloxane/dimethylsiloxane copolymer terminated at each end by a trimethylsiloxy group, a copolymer made up of $(CH_3)_2HSiO_{1/2}$ units and $SiO_{4/2}$ units, and a copolymer made up of $(CH_3)_2HSiO_{1/2}$ units, $SiO_{4/2}$ units, and $(C_6H_5)SiO_{3/2}$ units.

The organohydrogenpolysiloxane described above is preferably liquid at ordinary temperature, and desirably has a viscosity at 25° C. of from 0.1 to 500 cP, preferably from 0.5 to 300 cP. The number of silicon atoms in the molecule thereof may be usually about from 3 to 300, preferably about from 4 to 100.

The addition amount of ingredient (b) is such that the total amount of the directly silicon-bonded hydrogen atoms contained in ingredients (b) and (d) is from 0.4 to 5 equivalents, preferably from 0.8 to 2 equivalents, per alkenyl group contained in ingredient (a). If the amount thereof is smaller than 0.4 equivalent, too low a density of crosslinks results and this adversely influences the heat resistance of the waterproofing sealing part of the connector. If the amount thereof is larger than 5 equivalents, dehydrogenation may take place to pose a problem of foaming or adversely influence heat resistance.

The organohydrogenpolysiloxane of ingredient (b) can be produced by a known method. For example, it can be easily obtained by equilibrating octamethylcyclotetrasiloxane and/or tetramethylcyclotetrasiloxane with a compound containing a triorganosiloxy or diorganohydrogensiloxy unit capable of serving as a terminal group, e.g., hexamethyldisiloxane or 1,3-dihydro-1,1,3,3-tetramethyldisiloxane, at a temperature of about from −10° C. to +40° C. in the presence of a catalyst, e.g., sulfuric acid, trifluoromethanesulfonic acid, or methanesulfonic acid.

The platinum or platinum group metal compound, ingredient (c) in the present invention, is used as a catalyst for accelerating the addition reaction for curing (hydrosilylation) between ingredients (a) and (b). A known platinum or platinum group metal compound can be used. Examples thereof include platinum black, chloroplatinic acid, alcohol-modified chloroplatinic acids, and complexes of chloroplatinic acid with olefins, aldehydes, vinylsiloxane, acetylene alcohols, etc. Also usable are rhodium complexes.

The platinum or platinum group metal compound is added in a catalytic amount. Although the amount thereof can be suitably increased or reduced according to the desired curing rate, it is usually from 0.1 to 1,000 ppm, preferably from 1 to 200 ppm, of ingredient (a) in terms of platinum or rhodium amount.

An adhesion promotor employed in conventional addition-curing silicone adhesives is effectively used as ingredient (d) in the present invention. For example, use may be made of an organosilicon compound such as a linear or cyclic organosiloxane oligomer which contains at least one, usually about from 1 to 10, preferably about from 2 to 6, SiH groups per molecule and at least one group selected from epoxy groups, e.g., glycidoxy, alkoxysilyl groups, e.g., trimethoxysilyl, triethoxysilyl, and methyldimethoxysilyl, and anhydrous carboxy groups, and has about from 2 to 20, preferably about from 4 to 10, silicon atoms. Specific examples of the organosiloxane oligomer include the following compounds.

The above compounds are effective as ingredient (d) in the present invention in obtaining sufficient bonding strength. However, in the case where metallic molding tools, e.g., a mold, are used, the ingredient (d) has a drawback that it adheres to the molding tools. Although one means for eliminating this drawback is to use molding tools having a poorly bondable surface layer, e.g., molding tools coated with a Teflon resin, these molding tools may have poor reliability from the standpoint of service life. For eliminating the adhesion problem, a silicon compound which does not contain any of epoxy, alkoxy, and anhydrous carboxy groups is useful. Specifically, an organosilicon compound such as a linear, branched, or cyclic organosiloxane oligomer containing at least one, usually about from 1 to 20, preferably about from 3 to 10, SiH groups per molecule, having a phenyl or phenylene framework or a similar framework, and containing from 2 to 20, preferably about from 4 to 12, silicon atoms can be used as a compound which satisfactorily adheres to the thermoplastic resin or a composition containing the same but less adheres to metals. Examples of this organosiloxane oligomer are given below, of which the compounds each containing at least two phenyl or phenylene frameworks are preferred.

The phenyl silicone oil of ingredient (e) used in the present invention, which is represented by the following general formula (1), is incorporated into the silicone rubber composition. The silicone oil not only bleeds out and accumulates on the surface of the sealing part of the article according to the present invention to impart satisfactory sealing properties, but also functions to reduce the force necessary for fitting a housing to the mating one in a connector according to the present invention.

$$R^1-\underset{\underset{R^2}{|}}{\overset{\overset{R^2}{|}}{Si}}-(OSi)_n-R^1 \quad (1)$$

(with $R^2$ substituents on the Si in parentheses)

In general formula (1), $R^1$ represents an unsubstituted or substituted monovalent hydrocarbon group, a hydrolyzable group, or a hydroxyl group and $R^2$ represents an unsubstituted or substituted monovalent hydrocarbon group, provided that from 5 to 80% by mole, preferably from 10 to 50% by mole, of all the groups of $R^1$ and $R^2$ are phenyl. Further, n is an integer of 2 or larger, preferably from 2 to 100.

The unsubstituted or substituted monovalent hydrocarbon groups represented by $R^1$ and $R^2$ each has desirably 1 to 12, preferably 1 to 8, carbon atoms. Examples thereof include the same monovalent hydrocarbon groups as those enumerated hereinabove with regard to R.

Examples of the phenyl silicon oil include the following (Me represents a methyl group and Ph represents a phenyl group; the same applies hereinafter):

-continued

Two or more of these phenyl silicone oils may be used simultaneously.

The incorporation amount of ingredient (e) is preferably from 0.1 to 30 parts by weight per 100 parts by weight of the organopolysiloxane of ingredient (a). If the incorporation amount thereof is smaller than 0.1 part by weight, the effect of bleeding cannot be produced. If the amount thereof exceeds 30 parts by weight, there is the possibility that the molded article might have reduced properties or a weld line.

The finely powdered silica having a specific surface area of 50 m²/g or larger, used as ingredient (f) in the present invention, is a material which imparts strength to the elastomer formed by curing the composition according to the present invention. The silica should have the effect of reinforcing the silicone rubber. Although the specific surface area thereof as determined by the BET method should hence be not smaller than 50 m²/g, it is usually about from 50 to 1,000 m²/g, preferably about from 100 to 500 m²/g.

Examples of this finely powdered silica include hydrophilic silicas such as Aerosil 130, 200, and 300 (manufactured by Nippon Aerosil Co., Ltd., Japan and Degussa AG), Cabosil MS-5 and MS-7 (manufactured by Cabot Corp.), Rheorosil QS-102 and 103 (manufactured by Tokuyama Soda Co., Ltd., Japan), and Nipsil LP (manufactured by Nippon-Silica Industrial Co., Ltd., Japan); and hydrophobic silicas such as Aerosil R-812, R-812S, R-972, and R-974 (manufactured by Degussa AG), Rheorosil MT-10 (manufactured by Tokuyama Soda Co., Ltd.), and Nipsil SS series (manufactured by Nippon Silica Industrial Co., Ltd.).

In the case where a composition comprising the ingredients described above should be regulated so as to have a curing time suitable for practical use, a curing time regulator may be used, which is, for example, at least one member selected from the group consisting of vinylated organopolysiloxanes such as vinylcyclotetrasiloxane, triallyl isocyanurate, alkyl maleates, acetylene alcohols, silane- or siloxane-modified acetylene alcohols, hydroperoxides, tetramethylethylenediamine, and benzotriazole.

Other ingredients which can be added to the composition include nonreinforcing fillers such as a quartz powder, diatomaceous earth, and calcium carbonate, colorants such as inorganic pigments, e.g., cobalt blue, and organic dyes, and heat stabilizers and flame retardants such as cerium oxide, zinc carbonate, manganese carbonate, red iron oxide, titanium oxide, and carbon black.

Examples of molding methods usable for producing the integrally molded automotive waterproof connector of the present invention include: a method comprising placing an uncured addition-curing silicone rubber composition of a desired shape on a thermoplastic resin molded beforehand and heating the resulting structure at a temperature lower than the melting point of the thermoplastic resin (mold, coating, dipping, etc.); a method comprising placing an uncured addition-curing silicone rubber composition on a thermoplastic resin molded beforehand and compressing the resulting structure at a temperature lower than the melting point of the thermoplastic resin (molding at a temperature close to the softening temperature is economically advantageous and effective for producing a thin molded article); and a method comprising injecting a thermoplastic resin first into a mold with an injection molding machine and then injecting a heated addition-curing silicone rubber composition into the mold. In the last case, a temperature not lower than the softening temperature of the thermoplastic resin can be used for molding (or curing) the silicone rubber. For producing a housing made of the thermoplastic resin described above, molding techniques for regular thermoplastic resins can be used. A convenient example of such known methods comprises pelleting the thermoplastic resin, injecting the resin into a mold heated to a temperature not lower than the softening point of the thermoplastic resin, and then cooling the mold to a temperature lower than the softening point of the thermoplastic resin. An apparatus generally called an injection molding machine or transfer molding machine can be used. On the other hand, the uncured silicone rubber composition deposited on the thermoplastic resin molding may be any of the liquid, putty, and pasty states. However, from the standpoint of easiness of molding, the uncured composition desirably has the liquid or pasty consistency characteristic of so-called liquid silicone rubber compositions. The curing conditions for the silicone rubber composition in the present invention generally include a temperature of from 100 to 150° C. and a heating time of about tens of seconds.

The automotive waterproof connector of the present invention, which comprises a thermoplastic resin and tenaciously integrated therewith an oil-bleeding silicone rubber, has high sealing properties because a silicone oil begins to gradually bleed out after molding to seal the gap between the connector housings. The article of the present invention can be produced in an extremely short vulcanizing time and have satisfactory workability, and is hence highly advantageous also in cost.

The present invention will be explained below in detail by reference to Examples and Comparative Examples, but the invention should not be construed as being limited to the following Examples.

PREPARATION EXAMPLE 1

Preparation of Oil-bleeding Silicone Rubber Composition (A)

Into a kneader were introduced 100 parts by weight of a dimethylsiloxane polymer terminated at each molecular end by a dimethylvinylsilyl group and having a viscosity at 25° C. of 10,000 cP, 10 parts by weight of the phenyl silicone oil represented by formula (I) given below, 40 parts by weight of fumed silica having a specific surface area of 300 m$^2$/g (as measured by the BET method; the same applies hereinafter), 8 parts by weight of hexamethyldisilazane, and 1 part by weight of water. After being mixed at ordinary temperature for 1 hour, the contents were heated to 150° C., mixed at that temperature for 2 hours, and then cooled to ordinary temperature. Thereto were added 20 parts by weight of the same dimethylsiloxane polymer, terminated at each end by a dimethylvinylsilyl group and having a viscosity at 25° C. of 10,000 cP, 3 parts by weight of the hydrogenmethylpolysiloxane represented by formula (II) given below and having a viscosity at ordinary temperature (25° C.) of about 10 cP, 4 parts by weight of a vinylmethylpolysiloxane containing 5 mol % methylvinylsiloxane units [—Si(CH$_3$)(CH═CH$_2$)O—] with a directly silicon-bonded vinyl group as a side chain and having a viscosity at ordinary temperature (25° C.) of 1,000 cP, 0.1 part by weight of an acetylene alcohol for prolonging the curing time at ordinary temperature, and a platinum/vinylsiloxane complex in an amount of 50 ppm in terms of the amount of platinum atoms. The contents were sufficiently mixed until the mixture became homogeneous. Thus, an oil-bleeding liquid addition-curing silicone rubber composition (A) was prepared.

PREPARATION EXAMPLE 2

Preparation of Oil-bleeding Silicone Rubber Composition (B)

Into a kneader were introduced 100 parts by weight of a dimethylsiloxane polymer terminated at each molecular end by a dimethylvinylsilyl group and having a viscosity at 25° C. of 10,000 cP, 10 parts by weight of the phenyl silicone oil represented by formula (I) given above, 40 parts by weight of fumed silica having a specific surface area of 300 m$^2$/g, 8 parts by weight of hexamethyldisilazane, and 1 part by weight of water. After being mixed at ordinary temperature for 1 hour, the contents were heated to 150° C., mixed at that temperature for 2 hours, and then cooled to ordinary temperature. Thereto were added 20 parts by weight of the same dimethylsiloxane polymer, terminated at each end by a dimethylvinylsilyl group and having a viscosity at 25° C. of 10,000 cP, 5 parts by weight of the low-molecular methyl phenyl silicone oil represented by formula (III) given below, 3 parts by weight of the hydrogenmethylpolysiloxane represented by formula (II) given above and having a viscosity at ordinary temperature (25° C.) of about 10 cP, 4 parts by weight of a vinylmethylpolysiloxane containing 5 mol % methylvinylsiloxane units [—Si(CH$_3$)(CH═CH$_2$)O—] with a directly silicon-bonded vinyl group as a side chain and having a viscosity at ordinary temperature (25° C.) of 1,000 cP, 0.1 part by weight of an acetylene alcohol for prolonging the curing time at ordinary temperature, and a platinum/vinylsiloxane complex in an amount of 50 ppm in terms of the amount of platinum atoms. The contents were sufficiently mixed until the mixture became homogeneous. Thus, an oil-bleeding liquid addition-curing silicone rubber composition (B) was prepared.

(III)

EXAMPLE 1

Into an injection molding machine for thermoplastic resins was introduced a resin composition consisting of 100 parts by weight of a polycarbonate resin having a number-average molecular weight of about 10,000 and containing substantially no aliphatic unsaturated groups and 3 parts by weight of a polycarbonate oligomer which had been modified at the ends with isopropenyl groups, had a number-average molecular weight of about 2,000, and contained about 20 mol % monomer units containing an isopropenyl group. The composition was plasticated at 290° C. and then injected into the cavities of a mold for obtaining eight parts. Thus, male housings (1) shown in FIG. 1 were obtained. The male housings (1) molded each was set in a chrome-plated male mold. After the male mold was closed, a composition obtained by adding 2 parts by weight of the compound represented by formula (V) given later to 100 parts by weight of the oil-bleeding liquid addition-curing silicone rubber composition (A) obtained in Preparation Example 1 was injected into the mold in an appropriate amount. The silicone rubber composition was vulcanized at 120° C. for 60 seconds to mold a ring packing (3) integrated with the housing (1).

EXAMPLE 2

Into an injection molding machine for thermoplastic resins was introduced the same resin composition as in Example 1. The composition was plasticated at 290° C. and then injected into the cavities of a mold for obtaining eight parts. Thus, male housings (1) shown in FIG. 1 were obtained. The male housings (1) molded each was set in a chrome-plated male mold. After the male mold was closed, a composition obtained by adding 2 parts by weight of the compound represented by formula (VI) given later to 100 parts by weight of the oil-bleeding liquid addition-curing silicone rubber composition (A) obtained in Preparation Example 1 was injected into the mold in an appropriate amount. The silicone rubber composition was vulcanized at 120° C. for 60 seconds to mold a ring packing (3) integrated with the housing (1).

EXAMPLE 3

Into an injection molding machine for thermoplastic resins was introduced the same resin composition as in Example 1. The composition was plasticated at 290° C. and then injected into the cavities of a mold for obtaining eight parts. Thus, male housings (1) shown in FIG. 1 were obtained. The male housings (1) molded each was set in a chrome-plated male mold. After the male mold was closed, a composition obtained by adding 2 parts by weight of the compound represented by formula (VI) given later to 100 parts by weight of the oil-bleeding liquid addition-curing silicone rubber composition (A) obtained in Preparation Example 1 was injected into the mold in an appropriate amount. The silicone rubber composition was vulcanized at 150° C. for 30 seconds to mold a ring packing (3) integrated with the housing (1).

EXAMPLE 4

Into an injection molding machine for thermoplastic resins was introduced a resin composition consisting of 100 parts by weight of a poly(butylene terephthalate) resin having a number-average molecular weight of about 20,000 and containing substantially no aliphatic unsaturated groups and 3 parts by weight of a polycarbonate oligomer which had been modified at the ends with isopropenyl groups, had a number-average molecular weight of about 2,000, and contained about 20 mol % monomer units containing an isopropenyl group. The composition was plasticated at 290° C. and then injected into the cavities of a mold for obtaining eight parts. Thus, male housings (1) shown in FIG. 1 were obtained. The male housings (1) molded each was set in a chrome-plated male mold. After the male mold was closed, a composition obtained by adding 2 parts by weight of the compound represented by formula (V) given later to 100 parts by weight of the oil-bleeding liquid addition-curing silicone rubber composition (A) obtained in Preparation Example 1 was injected into the mold in an appropriate amount. The silicone rubber composition was vulcanized at 120° C. for 60 seconds to mold a ring packing (3) integrated with the housing (1).

EXAMPLE 5

Into an injection molding machine for thermoplastic resins was introduced the same resin composition as in Example 4. The composition was plasticated at 290° C. and then injected into the cavities of a mold for obtaining eight parts. Thus, male housings (1) shown in FIG. 1 were obtained. The male housings (1) molded each was set in a chrome-plated male mold. After the male mold was closed, a composition obtained by adding 2 parts by weight of the compound represented by formula (VI) given later to 100 parts by weight of the oil-bleeding liquid addition-curing silicone rubber composition (A) obtained in Preparation Example 1 was injected into the mold in an appropriate amount. The silicone rubber composition was vulcanized at 120° C. for 60 seconds to mold a ring packing (3) integrated with the housing (1).

EXAMPLE 6

Into an injection molding machine for thermoplastic resins was introduced the same resin composition as in Example 4. The composition was plasticated at 290° C. and then injected into the cavities of a mold for obtaining eight parts. Thus, male housings (1) shown in FIG. 1 were obtained. The male housings (1) molded each was set in a chrome-plated male mold. After the male mold was closed, a composition obtained by adding 2 parts by weight of the compound represented by formula (VI) given later to 100 parts by weight of the oil-bleeding liquid addition-curing silicone rubber composition (A) obtained in Preparation Example 1 was injected into the mold in an appropriate amount. The silicone rubber composition was vulcanized at 150° C. for 30 seconds to mold a ring packing (3) integrated with the housing (1).

EXAMPLE 7

Into an injection molding machine for thermoplastic resins was introduced a resin composition consisting of 100 parts by weight of a poly(butylene terephthalate) resin having a number-average molecular weight of about 20,000 and containing substantially no aliphatic unsaturated groups and 3 parts by weight of a polyester oligomer which had been modified at the ends with allyl groups, had a number-average molecular weight of about 1,800, and contained about 10 mol % allyl-containing monomer units. The composition was plasticated at 290° C. and then injected into the cavities of a mold for obtaining eight parts. Thus, male housings (1) shown in FIG. 1 were obtained. The male housings (1) molded each was set in a chrome-plated male mold. After the male mold was closed, a composition obtained by adding 2 parts by weight of the compound represented by formula (VI) given later to 100 parts by weight of the oil-bleeding liquid addition-curing silicone rubber composition (A) obtained in Preparation Example 1 was injected into the mold in an appropriate amount. The silicone rubber composition was vulcanized at 120° C. for 60 seconds to mold a ring packing (3) integrated with the housing (1).

EXAMPLE 8

Into an injection molding machine for thermoplastic resins was introduced the same resin composition as in Example 7. The composition was plasticated at 290° C. and then injected into the cavities of a mold for obtaining eight parts. Thus, male housings (1) shown in FIG. 1 were obtained. The male housings (1) molded each was set in a chrome-plated male mold. After the male mold was closed, a composition obtained by adding 2 parts by weight of the compound represented by formula (V) given below to 100 parts by weight of the oil-bleeding liquid addition-curing silicone rubber composition (B) obtained in Preparation Example 2 was injected into the mold in an appropriate amount. The silicone rubber composition was vulcanized at 120° C. for 60 seconds to mold a ring packing (3) integrated with the housing (1).

the oil-bleeding liquid addition-curing silicone rubber composition (A) obtained in Preparation Example 1 was injected into the mold in an appropriate amount. The silicone rubber composition was vulcanized at 120° C. for 60 seconds to mold a ring packing (3) integrated with the housing (1).

COMPARATIVE EXAMPLE 2

Into an injection molding machine for thermoplastic resins was introduced a poly(butylene terephthalate) resin having a number-average molecular weight of about 20,000 and containing substantially no aliphatic unsaturated groups. The resin was plasticated at 250° C. and then injected into the cavities of a mold for obtaining eight parts. Thus, male housings (1) shown in FIG. 1 were obtained. The male housings (1) molded each was set in a chrome-plated male mold. After the male mold was closed, a composition obtained by adding 2 parts by weight of the compound represented by formula (V) given above to 100 parts by weight of the oil-bleeding liquid addition-curing silicone rubber composition (A) obtained in Preparation Example 1 was injected into the mold in an appropriate amount. The silicone rubber composition was vulcanized at 120° C. for 60 seconds to mold a ring packing (3) integrated with the housing (1).

COMPARATIVE EXAMPLE 3

Into an injection molding machine for thermoplastic resins was introduced a poly(butylene terephthalate) resin having a number-average molecular weight of about 20,000 and containing substantially no aliphatic unsaturated groups. The resin was plasticated at 290° C. and then injected into the cavities of a mold for obtaining eight parts. Thus, male housings (1) shown in FIG. 1 were obtained. The male housings (1) molded each was set in a chrome-plated male mold. After the male mold was closed, a composition obtained by adding 2 parts by weight of the compound represented by formula (V) given above to 100 parts by

COMPARATIVE EXAMPLE 1

Into an injection molding machine for thermoplastic resins was introduced the same resin composition as in Example 4. The composition was plasticated at 290° C. and then injected into the cavities of a mold for obtaining eight parts. Thus, male housings (1) shown in FIG. 1 were obtained. The male housings (1) molded each was set in a chrome-plated male mold. After the male mold was closed, weight of an oilless liquid addition-curing silicone rubber composition obtained in the same manner as in Preparation Example 1 except that the phenyl silicone oil was omitted was injected into the mold in an appropriate amount. The silicone rubber composition was vulcanized at 120° C. for 60 seconds to mold a ring packing (3) integrated with the housing (1).

COMPARATIVE EXAMPLE 4

Into an injection molding machine for thermoplastic resins was introduced the same resin composition as in Example 4. The composition was plasticated at 290° C. and then injected into the cavities of a mold for obtaining eight parts. Thus, male housings (1) shown in FIG. 1 were obtained. The male housings (1) molded were coated with primer liquid DY32-101 (manufactured by Toray-Dow Corning-Silicone Co., Ltd.), and the coating was dried. Each primed housing was set in a chrome-plated male mold. After the male mold was closed, the oil-bleeding liquid addition-curing silicone rubber composition (A) obtained in Preparation Example 1 was injected into the mold in an appropriate amount. The silicone rubber composition was vulcanized at 120° C. for 60 seconds to mold a ring packing (3) integrated with the housing (1).

In the Examples and Comparative Examples given above, the molded articles were examined for housing/rubber packing adhesion and moldability immediately after rubber packing molding.

Figure 1:
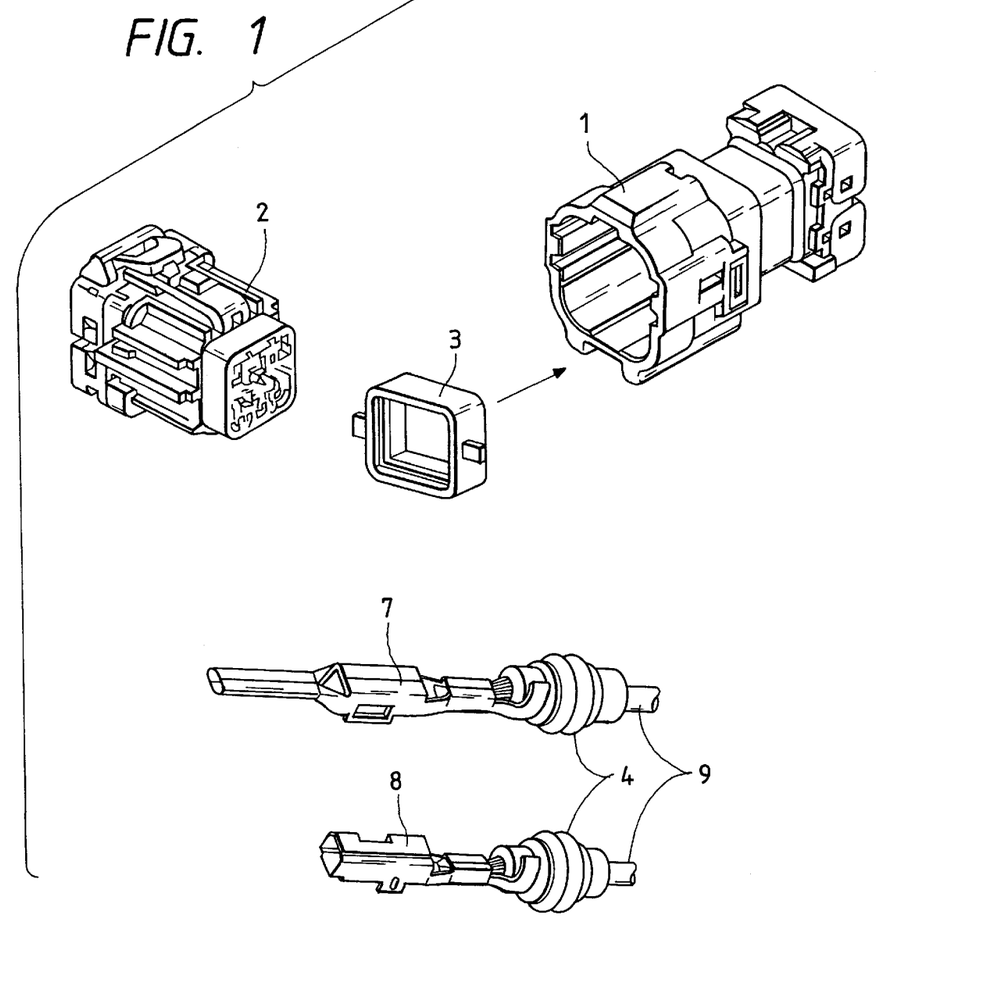
FIG. 1 is a view illustrating a method for using an integrally molded waterproof connector according to the present invention.
Figure 2:
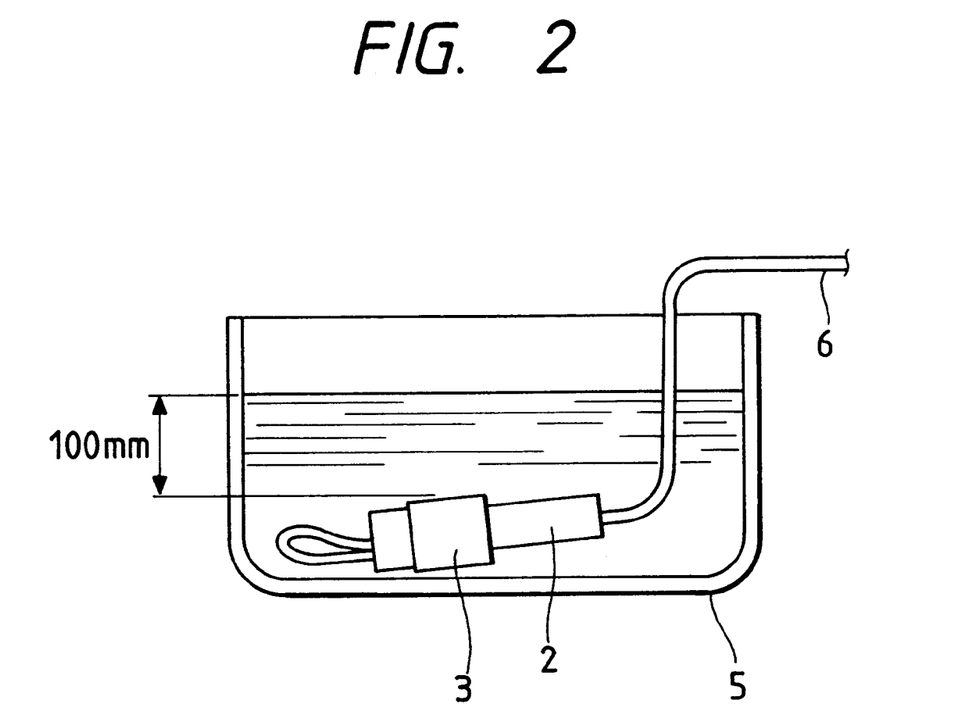
FIG. 2 is a view illustrating a method for testing the sealing performance of an integrally molded waterproof connector according to the present invention.

Further, a rubber plug (4) shown in FIG. 1 which had been molded from a different material was attached to each of the integral packing/housing (1, 3) moldings. A female housing (2) was then fitted into each of the integral moldings, and the force required for the fitting was measured with an apparatus for measuring compressive stress (Autograph, manufactured by Shimadzu Corp., Japan). Samples in which the fitting force was not higher than 6.3 kgf were judged to be satisfactory (o), while samples in which the fitting force was higher than 6.3 kgf were judged to be unsatisfactory (x). The fitted housings were subjected to a 120° C. 1,000-hour heat deterioration test. Thereafter, an air tube (6) was attached to part of the rubber plug-sealed part of the waterproof connector housings, and the connector housings were immersed in a water tank (5) as shown in FIG. 2 at a depth of about 10 cm from the surface of the water. Air was then introduced into the connector housings through the air tube (6) to heighten the pressure inside the housings by 9.8 kPa, and this state was maintained for 30 seconds to examine the housings for air leakage. The air pressure inside the housings was elevated in this manner up to 59 kPa. Samples which underwent no air leakage before the air pressure reached 59 kPa were judged to be satisfactory (o), while samples which underwent air leakage were judged to be unsatisfactory (x). Samples which had not undergone the heat treatment were also examined. The results obtained are shown in Table 1.

TABLE 1

| | Example | | | | | | | |
|---|---|---|---|---|---|---|---|---|
| | 1 | 2 | 3 | 4 | 5 | 6 | 7 | 8 |
| Adhesion and Moldability*1 | | | | | | | | |
| After 1 day | o | o | o | o | o | o | o | o |
| After 7 days | o | o | o | o | o | o | o | o |
| Fitting Force | o | o | o | o | o | o | o | o |
| | (5.5 kgf) | (5.4 kgf) | (5.5 kgf) | (5.7 kgf) | (5.6 kgf) | (5.6 kgf) | (5.7 kgf) | (5.5 kgf) |
| Water-proofness | | | | | | | | |
| Initial | o | o | o | o | o | o | o | o |
| After 120° C. 1000-hour treatment | o | o | o | o | o | o | o | o |

TABLE 1-continued

| | Comparative Example | | | |
|---|---|---|---|---|
| | 1 | 2 | 3 | 4 |
| Adhesion and Mobility | | | | |
| After 1 day | x | x | o | o |
| After 7 days | x | x | o | x |
| Fitting Force | unable to be measured*2 | unable to be measured | x (7.2 kgf) | o (5.6 kgf) |
| Water-proofness | | | | |
| Initial | unable to be measured | unable to be measured | o | o |
| After 120° C. 1000-hour treatment | unable to be measured | unable to be measured | o | o |

*1: The number of days from housing molding to rubber packing molding. In Comparative Example 4, the number of days from housing molding and priming to rubber packing molding.
o: Satisfactory adhesion between housing and rubber packing.
x: Rubber packing detached from housing in all samples, which were hence incapable of practical use.
*2: The samples were unable to be evaluated because of the packing detachment after packing molding.

According to the present invention, an integrally molded automotive waterproof connector can be provided which comprises a thermoplastic resin containing a thermoplastic resin oligomer having at least one aliphatic unsaturated group and an oil-bleeding silicone rubber integrally bonded to the resin. In the connector, the adhesion between the thermoplastic resin and the silicone rubber is satisfactory regardless of the length of storage period as compared with connectors comprising a thermoplastic resin and a silicone rubber integrated therewith after priming. Further, the connector of the present invention is excellent in production efficiency and workability, is reduced in connector housing fitting force, and can retain satisfactory waterproofness.

While the invention has been described in detail and with reference to specific embodiments thereof, it will be apparent to one skilled in the art that various changes and modifications can be made therein without departing from the spirit and scope thereof.

What is claimed is:

1. An integrally molded automotive waterproof connector comprising
    a polycondensation thermoplastic resin; and
    an oil-bleeding silicone rubber integrated with said thermoplastic resin;
    said thermoplastic resin containing a polycondensation thermoplastic resin oligomer containing at least one aliphatic unsaturated group, wherein the thermoplastic resin oligomer is a thermoplastic polycarbonate oligomer or a thermoplastic polyester oligomer.

2. The integrally molded automotive waterproof connector as claimed in claim 1, wherein the amount of the polycondensation thermoplastic resin oligomer containing at least one aliphatic unsaturated group is from 0.1 to 15 parts by weight per 100 parts by weight of the thermoplastic resin.

3. The integrally molded automotive waterproof connector as claimed in claim 2, wherein the oil-bleeding silicone rubber is a rubber obtained by curing a silicone rubber composition comprising:
    (a) an alkenyl-containing organopolysiloxane;
    (b) an organohydrogenpolysiloxane having at least two directly silicon-bonded hydrogen atoms per molecule, in such an amount that the total amount of the directly silicon-bonded hydrogen atoms contained in (b) and (d) is from 0.4 to 5 equivalents per mol of the alkenyl groups contained in (a);

(c) a catalytic amount of platinum or a platinum group metal compound;

(d) an adhesion promoter, wherein the adhesion promoter is present in an amount of 0.1 to 50 parts by weight per 100 parts by weight of the alkenyl-containing organopolysiloxane (a), and comprises an organosilicon compound;

(e) a phenyl silicone oil represented by the following general formula (1), (1)

in an amount of 0.1 to 30 parts by weight per 100 parts by weight of the alkenyl-containing organopolysiloxane (a), wherein $R^1$ represents an unsubstituted monovalent hydrocarbon group, a monovalent hydrocarbon group substituted with a halogen atom or a cyano group, a hydrolyzable group, or a hydroxyl group and $R^2$ represents an unsubstituted monovalent hydrocarbon group or a monovalent hydrocarbon group substituted with a halogen atom or a cyano group, provided that from 5 to 80% by mole of all the groups of $R^1$ and $R^2$ are phenyl; and n is a positive number of 2 or larger; and (f) a finely powdered silica having a specific surface area of 50 $m^2/g$ or larger, in an amount of 0 to 50 parts by weight per 100 parts by weight of the alkenyl-containing organopolysiloxane (a).

4. The integrally molded automotive waterproof connector as claimed in claim 3, wherein the polycondensation thermoplastic resin oligomer is a thermoplastic polycarbonate or polyester oligomer having a number-average molecular weight of from 250 to 5,000, and contains from 0.1 to 70 mol % monomer units containing an aliphatic unsaturated group.

5. The integrally molded automotive waterproof connector as claimed in claim 2, wherein the polycondensation thermoplastic resin oligomer is a thermoplastic polycarbonate or polyester oligomer having a number-average molecular weight of from 250 to 5,000, and contains from 0.1 to 70 mol % monomer units containing an aliphatic unsaturated group.

6. The integrally molded automotive waterproof connector as claimed in claim 1, wherein the oil-bleeding silicone rubber is a rubber obtained by curing a silicone rubber composition comprising:

(a) an alkenyl-containing organopolysiloxane;

(b) an organohydrogenpolysiloxane having at least two directly silicon-bonded hydrogen atoms per molecule, in such an amount that the total amount of the directly silicon-bonded hydrogen atoms contained in (b) and (d) is from 0.4 to 5 equivalents per mol of the alkenyl groups contained in (a);

(c) a catalytic amount of platinum or a platinum group metal compound;

(d) an adhesion promoter, wherein the adhesion promoter is present in an amount of 0.1 to 50 parts by weight per 100 parts by weight of the alkenyl-containing organopolysiloxane (a), and comprises an organosilicon compound;

(e) a phenyl silicone oil represented by the following general formula (1), (1)

in an amount of 0.1 to 30 parts by weight per 100 parts by weight of the alkenyl-containing organopolysiloxane (a), wherein $R_1$ represents an unsubstituted monovalent hydrocarbon group, a monovalent hydrocarbon group substituted with a halogen atom or a cyano group, a hydrolyzable group or a hydroxyl group and $R^2$ represents an unsubstituted monovalent hydrocarbon group or a monovalent hydrocarbon group substituted with a halogen atom or a cyano group, provided that from 5 to 80% by mole of all the groups of $R_1$ and $R^2$ are phenyl; and n is a positive number of 2 or larger; and (f) a finely powdered silica having a specific surface area of 50 $m^2/g$ or larger, in an amount of 0 to 50 parts by weight per 100 parts by weight of the alkenyl-containing organopolysiloxane (a).

7. The integrally molded automotive waterproof connector as claimed in claim 6, wherein the polycondensation thermoplastic resin oligomer is a thermoplastic polycarbonate or polyester oligomer having a number-average molecular weight of from 250 to 5,000, and contains from 0.1 to 70 mol % monomer units containing an aliphatic unsaturated group.

8. The integrally molded automotive waterproof connector as claimed in claim 1, wherein the polycondensation thermoplastic resin oligomer is a thermoplastic polycarbonate or polyester oligomer having a number-average molecular weight of from 250 to 5,000, and contains from 0.1 to 70 mol % monomer units containing an aliphatic unsaturated group.

9. The integrally molded automotive waterproof connector as claimed in claim 1, wherein the polycondensation thermoplastic resin oligomer is a thermoplastic polycarbonate or polyester oligomer having a number-average molecular weight of from 1,000 to 3,000, and contains from 5 to 50 mol % monomer units containing an aliphatic unsaturated group.

* * * * *